United States Patent [19]

Kakuta et al.

[11] Patent Number: 4,874,912
[45] Date of Patent: Oct. 17, 1989

[54] HOOK SWITCH

[75] Inventors: Toshio Kakuta, Higashiosaka; Hiroyuki Nagano, Kadoma, both of Japan

[73] Assignee: Hosiden Electronics Co., Ltd., Osaka, Japan

[21] Appl. No.: 196,056

[22] Filed: May 19, 1988

[30] Foreign Application Priority Data

Jul. 28, 1987 [JP] Japan .................................. 62-115403

[51] Int. Cl.⁴ ........................ H01H 15/02; H01H 3/02
[52] U.S. Cl. ................................ 200/16 D; 200/531; 200/335; 379/424; 379/427
[58] Field of Search ............. 379/424, 427, 422, 423, 379/425, 426; 200/1 TK, 1 B, 1 A, 5 R, 6 R, 6 B, 6 BA, 6 BB, 6 C, 16 R, 16 B, 16 C, 16 D, 335, 339, 520, 531

[56] References Cited

U.S. PATENT DOCUMENTS

| | | | |
|---|---|---|---|
| 2,727,954 | 12/1955 | Higbie et al. | 200/61.76 |
| 4,268,726 | 5/1981 | Chu | 200/6 C X |
| 4,497,983 | 2/1985 | Galloway et al. | 200/16 B X |
| 4,514,603 | 4/1985 | Staples | 200/61.76 X |
| 4,616,112 | 10/1986 | Galloway et al. | 200/16 D |
| 4,695,692 | 9/1987 | Noda | 200/6 BA X |
| 4,704,503 | 11/1987 | Takasawa | 200/16 D X |
| 4,733,028 | 3/1988 | Flumignan | 200/16 B |

Primary Examiner—J. R. Scott
Attorney, Agent, or Firm—Jones, Tullar & Cooper

[57] ABSTRACT

A hook switch has a box-shaped body an an open end. Within the box-shaped body there is fixed at least one contact piece, and extending from the box-shaped body is an arm on which an actuator is rotatably mounted. A slider is received within the box-shaped body. This slider has a spring biased protrusion with a spherical top which extends through a hole in a cover of the box-shaped body and is engaged by the actuator and displaced against the spring bias. In the process, a movable contact piece mounted on the slider engages a corresponding fixed contact piece mounted within the box-shaped body.

10 Claims, 3 Drawing Sheets ial receiving circuit to the outgoing and speaking
HOOK SWITCH

BACKGROUND OF THE INVENTION

1. Field of the Invention

This invention relates to a hook switch used mainly in a telephone set to switch over, for example, from the signal receiving circuit to the outgoing and speaking circuit and vice versa.

2. Description of the Prior Art

A conventional example of such a hook switch as stated above is shown in FIG. 5. This hook switch is composed of a body 100 and an actuator 200. On the body 100 are disposed plural contact pieces, for example as illustrated, a first contact piece 110 is sandwiched between a second contact piece 120 and a third contact piece 130 from both upper and lower sides with interspaces. Terminals 111, 121 and 131 extending from these contact pieces 110, 120, 130 are projected from the front edge of a bottom wall of the body 100. The front end part of the first contact piece 110 is elastically in contact with the lower surface of an engaging part 101 formed on the rear end part of the body 100. The actuator 200 is supported rotatably on a protrusion 102 installed on the body at its middle part in the longitudinal direction, and a first fitting part 201 located on the rear end corresponds to the second contact piece 120 and a second fitting part 202 corresponds to the third contact piece 130. The actuator 200 is here thrust downward at its rear end part by a spring 300.

In this hook switch, when a handset of a telephone set, for example, is lifted from the main body of the telephone set, the actuator 200 is thrust by the spring 300 to be in the state shown in the drawing. In this state, the second contact piece 120 is pushed in by the first fitting part 201 to come into contact with the first contact piece 110, while the third contact piece 130 is pushed in by the second fitting part 202 and moved away from the first contact piece 110. When the handset is, for example, placed on the telephone set and the front end part of the actuator 200 is pivoted downward about a support point P formed on the protrusion 102, the first fitting part 201 is moved upward along with the movement of the rear end of the actuator 200 in the upper direction, so that the second contact piece 120 is displaced upward and is parted from the first contact piece 110 as indicated by the virtual line. At the same time, the second fitting part 202 of the actuator 200 is moved upward and the third contact piece 130 is displaced upward as indicated by the virtual line to come into contact with the first contact piece 110.

In such a hook switch, for example, the timing of the second contact piece 120 to contact or part form the first contact piece 110 and the contacting pressure between them are related to the moving width $A_1$ of the first fitting part 201 in the vertical direction around the support point P, and this moving width $A_1$ is, in turn, related to the interspace $L_1$ between the first fitting part 201 and the support point P on/and to the height of the first fitting part 201 (the protruding width from the inner surface of the actuator 200). Likewise, the contacting and parting timings of the third contact piece 130 with regard to the first contact piece 110 and their contacting pressure are related to the interspace $L_2$ between the support point P and the second fitting part 202 or/and to the height of the second fitting part 202.

In a different type of hook switch in which plural second contact pieces 120 correspond to plural first contact pieces 110, respectively as shown in FIG. 6, if it is necessary to slightly shift these contacting and parting timings of the second contact pieces 120, with regard to the first contact pieces 110, it was conventionally designed to produce step differences at the positions $F_1$, $F_2$, $F_3$ on the first fitting part 201 corresponding to the second contact pieces 120, and to set the step differences to be switched for the contacting and parting timings. In a further different hook switch in which plural third contact pieces 130, correspond respectively to plural first contact pieces 110, step differences are formed at the positions of the second fitting part 202 confronting the third contact pieces 130, and the step differences are set precisely to be switched for the contacting and parting timings.

In the conventional hook switch, however, in order to obtain appropriate contacting and parting timings, it was necessary to set the interspaces $L_1$ and $L_2$ and the height of the first fitting part 201 and the second fitting part 202 precisely in relation to the moving widths $A_1$ and $A_2$ of the first contact piece 110 and the third contact piece 130, and moreover to set the step differences mounted on the first fitting part 201 and the second fitting part 202 precisely. It is very troublesome technically from a design point of view to set them precisely, and the hook switch thus became too expensive. In addition, in variously designed telephone sets, diversified shapes of actuators 200 are required. But in the conventional hook switch in which the first fitting part 201 and the second fitting part 202, that control the contacting and parting timings, are mounted on the actuator 200 itself, it was impossible to fully meet such demands for diversification because of the difficulty in design and technique as stated above.

On the other hand, in the conventional hook switch, when the number of contact pieces increases, the elasticity of these contact pieces significantly influences the operating effort of the actuator 200, so that a greater force is required to operate the actuator. Hence, these was a limit to making a multipolar system by increasing the number of contact pieces, which hindered its application into the apparatus such as telephone sets having a lot of control circuits.

SUMMARY OF THE INVENTION

In order to solve the above problems, it is hence a primary object of this invention to provide a hook switch capable of relatively easily setting the contacting and parting timings precisely by separating the members related to the contacting and parting timings of the contact pieces from the actuator.

It is another object of this invention to provide a hook switch capable of easily meeting the demands for diversification of the shapes against the actuator, and reducing the production cost of the actuator, by changing the design so as not to require the preciseness in the production of the actuator.

It is another object of this invention to provide a hook switch in which the actuator operating effort might not increase so much even by the introduction of the multipolar system.

It is a further object of this invention to provide a hook switch having a self-cleaning function on the contact points, and possessing enhanced contact stability and switching characteristics of the contact points.

It is still another object of this invention to provide a hook switch reduced in its wall thickness on the whole.

To achieve the above object as well as others, a hook switch of this invention comprises:

a box-shaped body with the bottom, having an opening on one side;

a fixed contact piece in which a contact surface is allocated inside the body;

a slider slidably built in the body, and having a protrusion, the tip of which is spherical and protrudes to the opening side of the body in the state of being fitted in the body;

a movable contact piece which transfers between the inner side of the body and the contact surface of the fixed contact piece while being elastically in contact with them when the slider slides in the body;

a spring allocated between the slider and the bottom wall of the body, and always thrusting in a direction to push the slider out from the opening of the body;

a cover mounted on the opening of its body to prevent the slider from slipping out due to the thrust force of the spring, and having a through-hole formed so that the protrusion of the slider is inserted;

an arm installed protrusively on the side wall of the body; and an actuator supported rotatably on the tip of the arm, the top wall of which abuts against the protrusion of the slider.

In a hook switch constructed in such a way, when the slider is slid against the thrust force of the spring by pushing in the actuator, the movable contact piece transfers between the inner surface of the body and the contact surface of the first contact piece while being elastically in contact with them, and thus the contact point is switched over. In this case, the contacting and parting timings of the contact pieces with each other are decided by the pattern of the fixed contact piece mounted on the body regardless of the shape of the actuator, so that it can be set precisely in a relatively easy way. Additionally, the fact that preciseness is not required in the shape of the actuator makes is possible to produce inexpensive actuators and to meet the demands for diversifying the shape of the actuators. And moreover, since the actuator operating effort is a force that can overcome the thrust force of the spring and the frictional resistance accompanying the elastic contact of the movable contact piece, the frictional resistance cannot become so large even if the number of movable contact pieces is increased. A large force is therefore not required for the actuator operating effort is a multipolar hook switch having many contact pieces. In addition, in the state that the movable contact piece rides on the contact surface of the fixed contact piece, the movable contact piece is in contact with the fixed contact piece by elasticity, so that both contact pieces always contact with each other with an even contact pressure. A stable contact point characteristic can hence be obtained. On the other hand, when the movable contact piece rides on the fixed contact piece, a self-cleaning function is executed because the fixed contact piece is rubbed.

In the hook switch of this invention, moreover, the contact surface of the fixed contact piece is located on the same surface with the inner surface of the body.

By such a construction, the movable contact piece can be transferred more smoothly and instantly between the inner surface of the body and the contact surface of the fixed contact piece while being elastically in contact with them. The lessening effects of the actuator operating effort, stability of contact, and switching characteristic of the contact points are consequently enhanced when the hook switch is multipolarized.

The hook switch of this invention is in a box shape to contain the body therein when the actuator is turned in the press-in direction around its front end part.

When constructed in such a way, the hook switch can be reduced in thickness, and the body and the arm can be completely concealed when, for example, the handset is hooked.

In the hook switch of this invention, the movable contact piece is composed of plural comb teeth linked at their roots the tips of which are bent, and the roots are fixed on the slider.

When constructed in this way, the movable contact piece can move surely along with the slider and contact with the contact surface of the fixed contact piece at a uniform pressure.

Moreover, by mounting a pair of pin-shaped protrusions opposing each other onto the actuator and engaging and inserting these protrusions in the engaging hole formed on the arm, the actuator can be supported rotatably on the arm.

Besides, by integrally forming a stopper piece on the protrusions mounted on the actuator, and abutting the stopper piece against the engaging part formed on the arm, the rotating range of the actuator can be defined, and the trouble, for example, that the handset becomes difficult to be set in place because the actuator has rotated excessively due to the impetus pushed by the spring, can be prevented.

DESCRIPTION OF THE PREFERRED EMBODIMENTS

Figure 1:
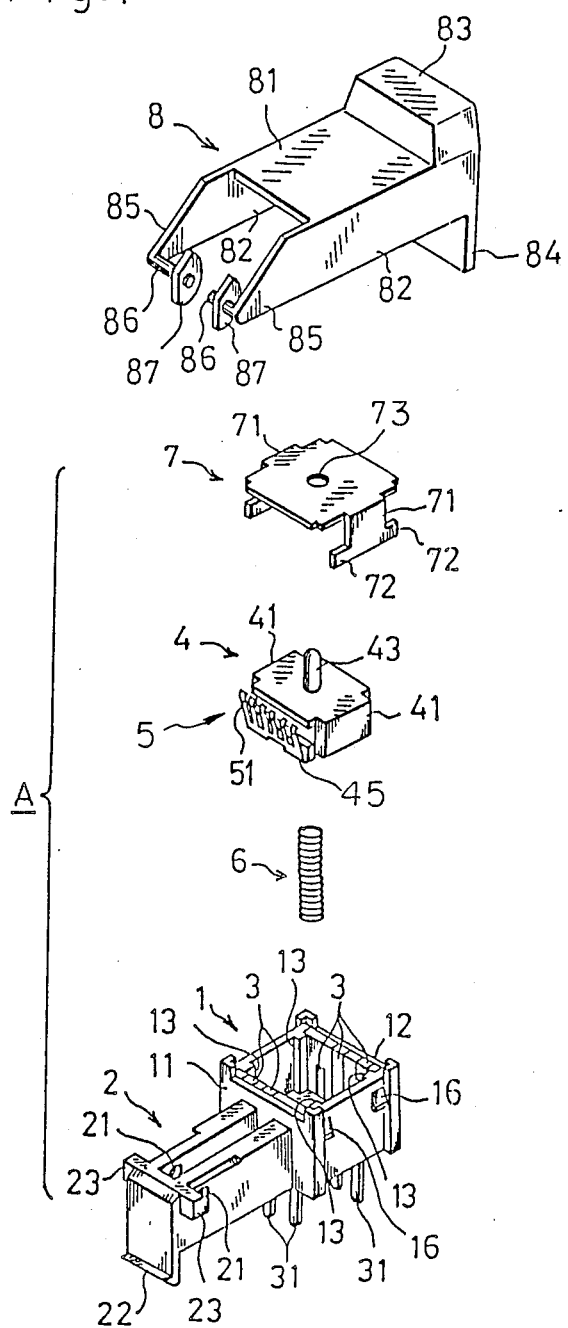
FIG. 1 is an exploded perspective view showing an embodiment of a hook switch according to this invention.
Figure 2:
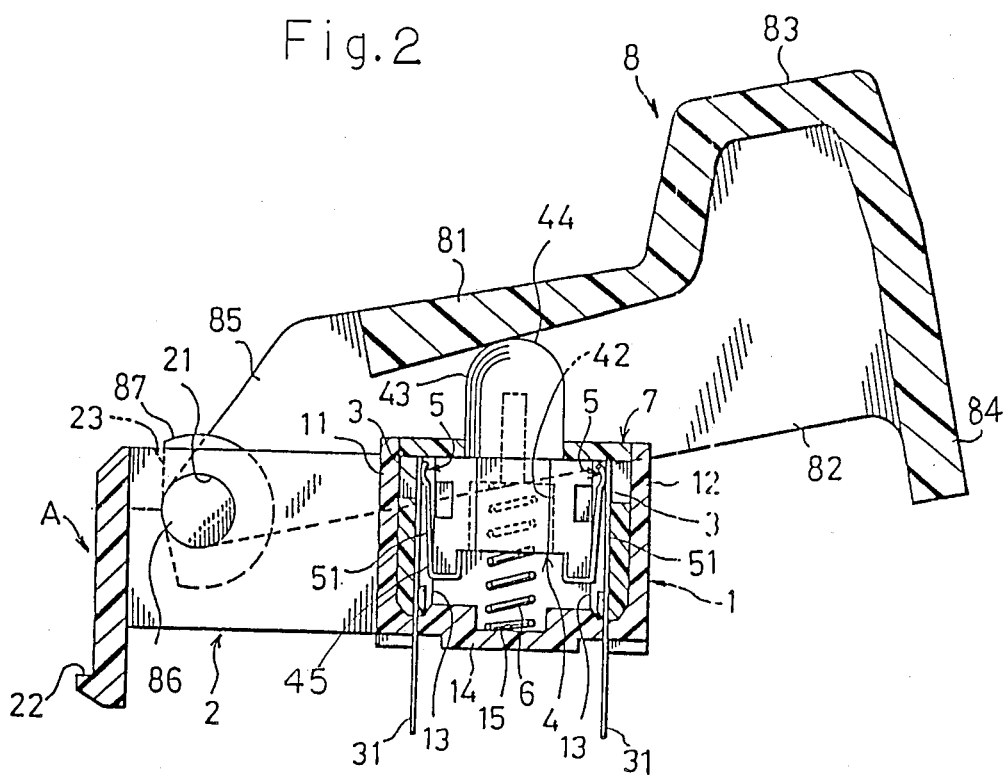
FIG. 2 is a magnified longitudinal sectional view of the hook switch shown in FIG. 1.
Figure 3:
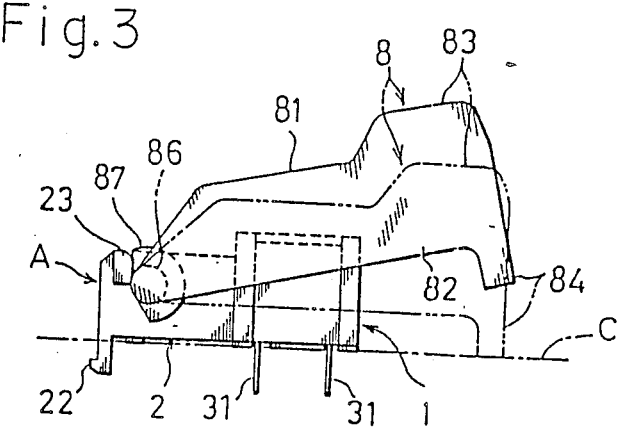
FIG. 3 is a side elevation showing the state of using the hook switch shown in FIG. 1.

As shown in FIG. 1 to FIG. 3, on the side wall of a box-shaped body 1 with a bottom, an arm 2 is protrusively mounted integrally on the body 1. On the plural points of the confronting front and rear side walls 11, 12 of the body 1, fixed contact pieces 3 extending vertically are mounted. These fixed contact pieces 3 are located so that their contact surfaces may be flush with the inner surface of the body, and terminals 31 extending from them penetrate the bottom wall 14 of the body 1 to protrude downward. The arm 2 is equipped with an engaging hole 21 at its tip and a pawl piece 22 engaged in a mounting hole of a mounting substrate (for example, a printed wiring board) not shown in the drawing.

A slider 4 is built in the body 1. The slider 4 is mounted by inserting protrusions 41, 41 provided on both of its sides slidably between projections 13 mounted at four corners in the body 1. On this slider 4 is mounted a movable contact piece 5. The movable contact piece 5 is produced by bending the tops of plural tooth-like comb pieces 51 linked at their roots into a curved shaped, and root 45 is fixed on the bottom end of the slider 4. Each one of the tooth-like comb pieces 51, of the movable contact piece 5, of course, corresponds to a respective one of the fixed contact pieces 3.

Between the bottom wall 14 of the body 1 and the slider 4, a spring 6 is installed, which always exerts a bias or thrust in a direction to push out the slider 4 from the opening of the body 1. The spring 6 is, here, inserted between a positioning hole 15 formed in the body and a positioning hole 42 formed in the slider 4 (FIG. 2).

On the body 1, a cover 7 is mounted to close the opening on the upper surface of the body 1. The cover 7 is mounted on the body 1 by pinching inverted-T-shaped legs 71, 71 which are integrally mounted on both of its edges outside the body 1, and arresting stopping parts 72, 72 of the legs 71, 71 on engaging parts 16, 16 mounted on the side wall of the body 1. The cover 7 mounted on the body 1 prevents the slider 4 from slipping out of the opening due to the thrust of the spring 6. A through-hole 73 is moreover formed on the cover 7, and a protrusion 43 mounted on the upper surface of the slider 4 is protruded from the through-hole 73. The tip 44 of the protrusion 43 is formed in a spherical shape.

The aforesaid body 1, arm 2, fixed contact piece 3, slider 4, movable contact piece 5, spring 6 and cover 7 are indispensable members for the main body of the hook switch. On the main body A of a switch constructed by combining these members as shown in FIG. 2, it is possible to mount an actuator 8 in a variety of shapes. Before describing embodiments of the actuator 8, the operation of the main body A of the switch is explained below.

As is possibly analogized from FIG. 3, the main body A of the switch can be mounted easily on the mounting substrate C by the engaging the pawl piece 22 of the arm 2 with the mounting hole of the mounting substrate C, and at the same time, inserting a terminal 31 in a terminal hole of the mounting substrate C.

If the protrusion 43 of the slider 4 is pushed in, and the slider 4 is slid in the body 1 against the thrust of the spring 6, the movable contact piece 5, along with the movement, slides in a state of elastic contact with the inner surface of the side wall 12 of the body 1 or the contact surface of the fixed contact piece 3. When the pressing force applied on the protrusion 43 is released, the slider 4 recovers to the original position owing to the thrust of the spring 6.

Figure 4:
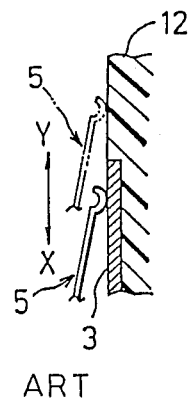
FIG. 4 is a partial sectional view showing the transferring state of the movable contact piece.
Figure 5:
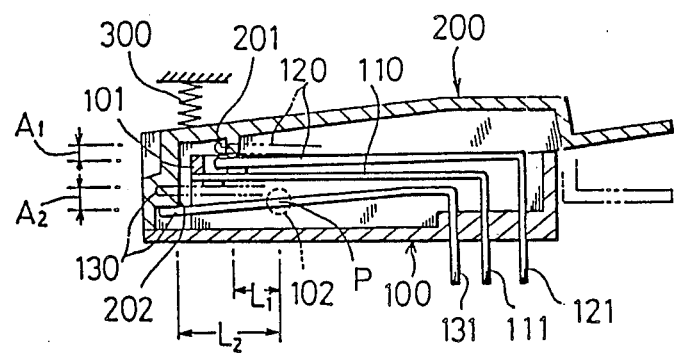
FIG. 5 is a sectional view of a conventional switch.
Figure 6:
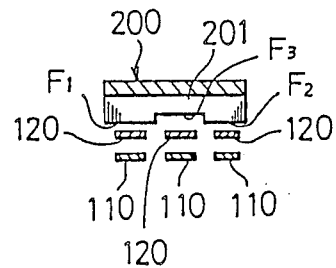
FIG. 6 is an explanatory sectional view of a conventional multipolarized hook switch.

In this way, if the movable contact piece 5 slides with the contact surface of the fixed contact piece 3 at the time when the slider 4 slides in the body 1, both surfaces rub against each other and are self-cleaned, so that the contact stability between the contact pieces is enhanced. And, for example, if the movable contact piece 5 transfers onto the contact surface of the fixed contact piece 3 after sliding on the inner surface of the side wall 12 as indicated by arrow X in FIG. 4, the transfer can be performed instantly and the contact pressure after the transfer can be kept uniform. An even if the movable contact piece 5 transfers onto the inner surface of the side wall 12 after sliding on the contact surface of the fixed contact piece 3 as indicated by arrow Y in FIG. 4 contrary to the above example, the transfer can also be executed instantly. The contact pressure between the contact pieces consequently does not come to gradually increase or gradually decrease along with the rotation of the actuator 200 as in the conventional example, for instance, described in FIG. 5, and superior switching characteristics of the contact point and preferably contact stability therefore can be obtained. Such operational efforts can be executed when the inner surface of the body 1 and the contact surface of the fixed contact piece 3 are flush with each other, but even if a little step difference exists, its effectiveness can be sufficiently obtained.

The contacting and parting timings between the contact pieces are, meanwhile, determined by the pattern of the fixed contact piece 3 mounted on the body 1. It is not so necessary to enhance the manufacturing precision of the slider 4 when setting the contacting and parting timings.

Incidentally, when the system is multipolarized by increasing the fixed contact piece 3 and the movable contact piece 5 in number, the elastically contacting force of the movable contact piece 5 against the inner surface of the side wall 12 of the body 1 and the contact surface of the fixed contact piece 3 is strengthened, so that, according to the free increase it is necessary to augment the force required in pushing in the slider 4 and the force of spring 6, but the increment of the elastic contact force is not enlarged so much by the multipolarization. Accordingly, it is unnecessary to increase the force to operate the slider 4 and the spring force as much as in the conventional way, and the multipolarization can be thus achieved easily.

A practical example of the actuator 8 is next explained. The actuator 8 shown in FIG. 1 and FIG. 2 is constructed in a box shape comprising an upper wall 81, right and left side walls 82, 82, a bulge-out part 83 and a drooping part 84. On arms 85, 85 extended from the side walls 82, 82, opposing pin-shaped protrusions 86, 86 are mounted, and stopper pieces 87, 87 are integrally provided on these protrusions 86 86. In this actuator 8, the protrusions 86, 86 at the top are engaged with the engaging hole 21 of said arm 2 in the state of being inserted, and are supported rotatably. The upper wall 81 is abutting against the protrusion 43 of said slider 4.

Therefore, when the bulge-out part 83 of the actuator 8 is pushed down, its upper wall 81 pushes down the protrusion 43, and the slider 4 is, as described above, slid against the thrust of the spring 6. When the bulge-out part 83 of the actuator 8 is pushed down, the actuator 8 covers the main body A of the switch so that the main body A of the switch is housed in the actuator 8 as indicated by virtual lines in FIG. 3. As apparent from the above description, the actuator 8 has a role only to push down the slider 4, and it is not required so much to heighten the manufacturing precision of the actuator 8. Besides, as for the actuator 8, its shape is not particularly specified as in the illustrated example as far as it possesses the protrusion 86 at the tip and the upper wall 81 and therefore it is not necessary to enhance the manufacturing precision so much so that the shape can be diversified easily. In the example shown in the drawing, where the engaging part 23 is formed on the arm 2 and the drooping part 84 is formed on the actuator 8, the rotating range of the actuator 8 can be limited in the range between the position where the stopper piece 87 meets with the engaging part 23 and the position where the drooping part 84 comes into contact with the mounting substrate C. When constructed and when such a way, in the case hook switch is used, for example, in a telephone set, neither the actuator 8 springs up excessively due to the thrust force of the spring 6 so as to make it difficult to put down the handset when it is lifted up, nor the actuator 8 is pushed in excessively to damage the contact pieces in the body when the handset is put down.

The actuator can fulfill the minimum function if it can press the protrusion of the slider by its upper wall.

What is claimed is:

1. A hook switch, comprising:
   a box-shaped body having a bottom wall and an open end;
   at least one fixed contact piece having a contact surface located within said body;
   a slider slidably received within said body, and having a protrusion with a spherical top protruding through said open end of said body;
   at least one movable contact piece which elastically contacts the contact surface of said at least one fixed contact piece when the slider slides in said body;
   a spring located between the slider and the bottom wall of said body, said spring exerting a biasing force in a direction to put the slider out from said at least one opening;
   a cover mounted on the open end of said body to prevent the slider from slipping out of said body due to said biasing force of said spring, said cover having a through-hole formed therein through which said protrusion of said slider is inserted;
   an arm extending outwardly from said body, said arm defining a tip; and
   an actuator supported rotatably on the tip of said arm, said actuator having a top wall which abuts against said protrusion of said slider.

2. A hook switch as set forth in claim 1, wherein said body includes an inner surface, and wherein the contact surface of said at least one fixed contact piece is located flush with the inner surface of said body.

3. A hook switch as set forth in claim 1, wherein said actuator defines a box-shaped space into which said body is received when said actuator is rotated around said tip of said arm in a direction to push in said protrusion.

4. A hook switch as set forth in claim 1, wherein said at least one movable contact piece comprises the bent tips of plural tooth-like comb pieces linked at their root, said root being fixed on said slider.

5. A hook switch as set forth in claim 1, wherein said actuator includes a pair of opposed pin-shaped protrusions mounted thereon which are inserted in and engaged with a respective hole formed on said arm so as to support the actuator rotatably on said arm.

6. A hook switch as set forth in claim 5, wherein said actuator further includes at least one stopper piece integrally formed on a pin of said pair of pin-shaped protrusions, and wherein the rotating range of the actuator is controlled by said at least one stopper piece abutting an engaging part form on said arm.

7. A hook switch as set forth in claim 2, wherein said actuator defines a box shape space into which said body is received when said actuator is rotated around said tip of said arm in a direction to push in said protrusion.

8. A hook switch as set forth in claim 7, wherein said actuator includes a pair of opposed pin-shaped protrusions mounted thereon which are inserted in and engaged with a respective hole formed on said arm so as to support the actuator rotatably on said arm.

9. A hook switch as set forth in claim 8, wherein said actuator further includes at least one stopper piece integrally formed on a pin of said pair of pin-shaped protrusions, and wherein the rotating range of the actuator is controlled by said at least one stopper piece abutting an engaging part form on said arm.

10. A hook switch as set forth in claim 9, wherein said at least one movable contact piece comprises the bent tips of plural tooth-like comb pieces linked at their root, said root being fixed on said slider.

* * * * *